(12) United States Patent
Chang

(10) Patent No.: US 6,310,416 B1
(45) Date of Patent: Oct. 30, 2001

(54) RESISTING AND PULLING MECHANISM

(76) Inventor: Huang-Tung Chang, P.O. Box 23-487, Changhua City 500 (TW)

( * ) Notice: Subject to any disclaimer, the term of this patent is extended or adjusted under 35 U.S.C. 154(b) by 0 days.

(21) Appl. No.: 09/502,234

(22) Filed: Feb. 11, 2000

(51) Int. Cl.[7] .............................. H02K 49/04; B60L 7/00
(52) U.S. Cl. ........................ 310/105; 310/263; 188/164
(58) Field of Search ............................. 310/263, 105, 310/103, 104, 92–93, 265, 98, 268, 77, 211, 76–78; 188/164, 267, 158; 74/572

(56) References Cited

U.S. PATENT DOCUMENTS

| | | | | |
|---|---|---|---|---|
| 3,824,420 | * | 7/1974 | Stegeman et al. ............... | 310/266 |
| 4,713,567 | * | 12/1987 | Fey et al. ............... | 310/105 |
| 4,780,637 | * | 10/1988 | Wolcott ............... | 310/105 |
| 4,853,573 | * | 8/1989 | Wolcott et al. ............... | 310/105 |
| 5,015,926 | * | 5/1991 | Casler ............... | 318/9 |
| 5,042,794 | * | 8/1991 | Sun ............... | 310/94 |
| 5,072,930 | * | 12/1991 | Sun ............... | 310/94 |
| 5,215,169 | * | 6/1993 | Kuwahara ............... | 310/105 |
| 5,711,404 | * | 1/1998 | Lee ............... | 188/164 |

* cited by examiner

Primary Examiner—Tran Nguyen

(57) ABSTRACT

A resisting and pulling mechanism comprises an excited magnetic disk and a braking wheel mounted coaxially with the excited magnetic disk which is provide with an excited magnetic coil. The braking wheel and the excited magnetic disk are separated from each other by an air gap. As the excited magnetic coil is provided with electric current, a magnetic field is effected around the excited magnetic coil. In the meantime, a magnetic flux is brought about on the excited magnetic disk. As the braking wheel is in motion, the eddy current is induced between the braking wheel and the magnetic poles of the excited magnetic disk such that the eddy current interacts with the magnetic flux to effect a rotation moment. When the excited magnetic disk is exerted on by an external force opposite in direction to the rotation moment, a resistance is effected such that the resistance can be transmitted to an external device which is connected with the excited magnetic disk via a pulley or belted wheel.

5 Claims, 17 Drawing Sheets

RESISTING AND PULLING MECHANISM

FIELD OF THE INVENTION

The present invention relates to a resistance-effecting mechanism capable of reversing a rotary wheel in motion as soon as the rotary wheel is relieved of an external force exerting thereon. The present invention is based on the principle that the direct current magnetic field has a braking effect on an electrically-conductive body in motion. The present invention is provided with a power source control mechanism capable of digital control of the magnitude of the electric current input so as to enable a user of the present invention to adjust precisely the magnitude of a resistance force and the magnitude of the reaction force of the pulling force. The present invention is further provided with a means for reducing the pulling force so as to enhance the performance of a device on which the present invention is applied.

BACKGROUND OF THE INVENTION

The conventional devices for effecting a resistance are generally provided with a friction means, an oil pressure means, a vortex, a generator, etc. These conventional devices are generally defective in design in that they are capable of effecting a resistance of a limited intensity, and that they are incapable of pulling back an object in motion. As a result, the application of the conventional devices is limited to the exercise machine, such as the exercise bicycle or the like. In other words, the conventional devices can not be used in conjunction with the exercise devices, such as an arm developing device, a rowing device, a chest building device, etc. the conventional exercise devices are generally provided with a lead block as a load. The lead block falls back to its original position as soon as the lead block is releved of the application force. The user of such conventional exercise devices is susceptible to bodily injury which is caused by the reaction force of the lead block. In other words, the lead block is a primitive means for providing an exercise device with a load. Among the conventional devices for effecting a resistance, the most advanced device is provided with an electromagnetic coil as the magnetic field source for effecting the resistance, which can be adjusted in magnitude by the digital or analog device, as shown in FIG. 1. This prior art device is provided with an electromagnetic core A on which an electromagnetic coil R is wound. The electromagnetic core A is of a U-shaped construction and is provided with a space M in which the rim of a braking wheel is received. When the coil is provided with the electric current, a magnetic field is brought about. In the meantime, the magnetic flux is brought about on the core A. As the braking wheel is actuated to turn, the rim of the braking wheel in motion moves through the space M of the core A, thereby resulting in the production of eddy current which forms a reverse rotation moment serving as a load to the braking wheel. Such a prior art device as described above with reference to FIG. 1 is defective in design in that the application point of the resistance effected by the device is relatively small, and that the magnetic loop of the prior art device is vulnerable to magnetic leakage. As a result, the braking wheel in motion can not be effectively controlled by the resistance which is brought about by the prior art device.

SUMMARY OF THE INVENTION

The primary objective of the present invention is to provide a resisting and pulling mechanism which is free from the drawbacks of the prior art device described above.

It is another objective of the present invention to provide a resisting and pulling mechanism which is suitable for use in a variety of devices, especially the exercise devices.

In keeping with the principle of the present invention, the foregoing objectives of the present invention are attained by a resisting and pulling mechanism capable of providing a rotary wheel with a strong resistance force such that the rotary wheel in motion is pulled back at the time when the rotary wheel in motion is relieved of an application force exerting thereon. The mechanism of the present invention is thus suitable for use in the exercise devices, such as the arm developing machine, the rowing machine, the chest building machine, etc. The magnitude of the resistance effected by the mechanism of the present invention can be adjusted as desired. For example, when an exerciser releases the pull handles of the arm developing machine or the chest building machine, the mechanism of the present invention prevents the pull handles from moving back suddenly. As a result, the arms or the body of the exerciser can be protected from the reaction force, which is moderated by the mechanism of the present invention.

The important advantage of the present invention is that the application force surface of the resistance is relatively larger, and that the magnetic loop of the present invention is not susceptible to magnetic leakage, and further that the electric current input of the present invention is capable of bringing about a stable magnetic flux which interacts with the eddy current to effect a reverse rotation moment (resistance) of a greater magnitude. The rotation of the rotary wheel can be thus effectively controlled by the present invention. In addition, the resistance effected by the mechanism of the present invention can be transmitted to an external device.

The present invention is further characterized by an excited magnetic disk or cylinder, which is provided with an excited magnetic coil and is coaxially disposed along with a braking wheel such that the exited magnetic disk and the braking wheel are separated from each other by an air gap. As the excited magnetic coil is provided with the electric current, a magnetic field is brought about around the coil. In the meantime, a magnetic flux is brought about on the excited magnetic disk or cylinder. As the excited magnetic disk and the braking wheel turn in relation to each other, the eddy current is induced between the magnetic poles and the braking wheel such that the eddy current interacts with the magnetic flux to effect a rotation moment opposite in direction to the rotation of the braking wheel. The resistance so effected by the present invention is used as a load in a variety of devices, especially the exercise devices. The resistance can be also transmitted externally by means of a pulley or a belted wheel.

In the event that the braking wheel turns without interruption, the eddy current is induced between the braking wheel in motion and the excited magnetic disk. The eddy current interacts with the magnetic flux to bring about a rotation moment. When the excited magnetic disk is exerted on by an external force opposite in direction to the rotation moment, a resistance force is effected. When the excited magnetic disk is relieved of the external force exerting thereon, the excited magnetic disk is acted on by the rotation moment such that the excited magnetic disk is pulled back. In the meantime, the current input is reduced to result in the corresponding reduction in the strength of the rotation moment, thereby causing the pulling force of the excited magnetic disk to become weaker. As a result, the present invention can be used as a moderating mechanism of the arm developing machine, the rowing machine, the chest building machine, etc. In other words, the moderating mechanism of the present invention can avert the bodily injury of an exerciser. The magnitude of the rotation moment is dependent on the relative rotational speed difference and the magnitude of the excited magnetic current. As a result, the rotation moment output can be regulated by the input of the excited magnetic current.

The foregoing objectives, features, functions, and advantages of the present invention will be more readily understood upon a thoughtful deliberation of the following detailed description of two preferred embodiments of the present invention with reference to the accompanying drawings.

DETAILED DESCRIPTION OF THE PREFERRED EMBODIMENTS

Figure 2:
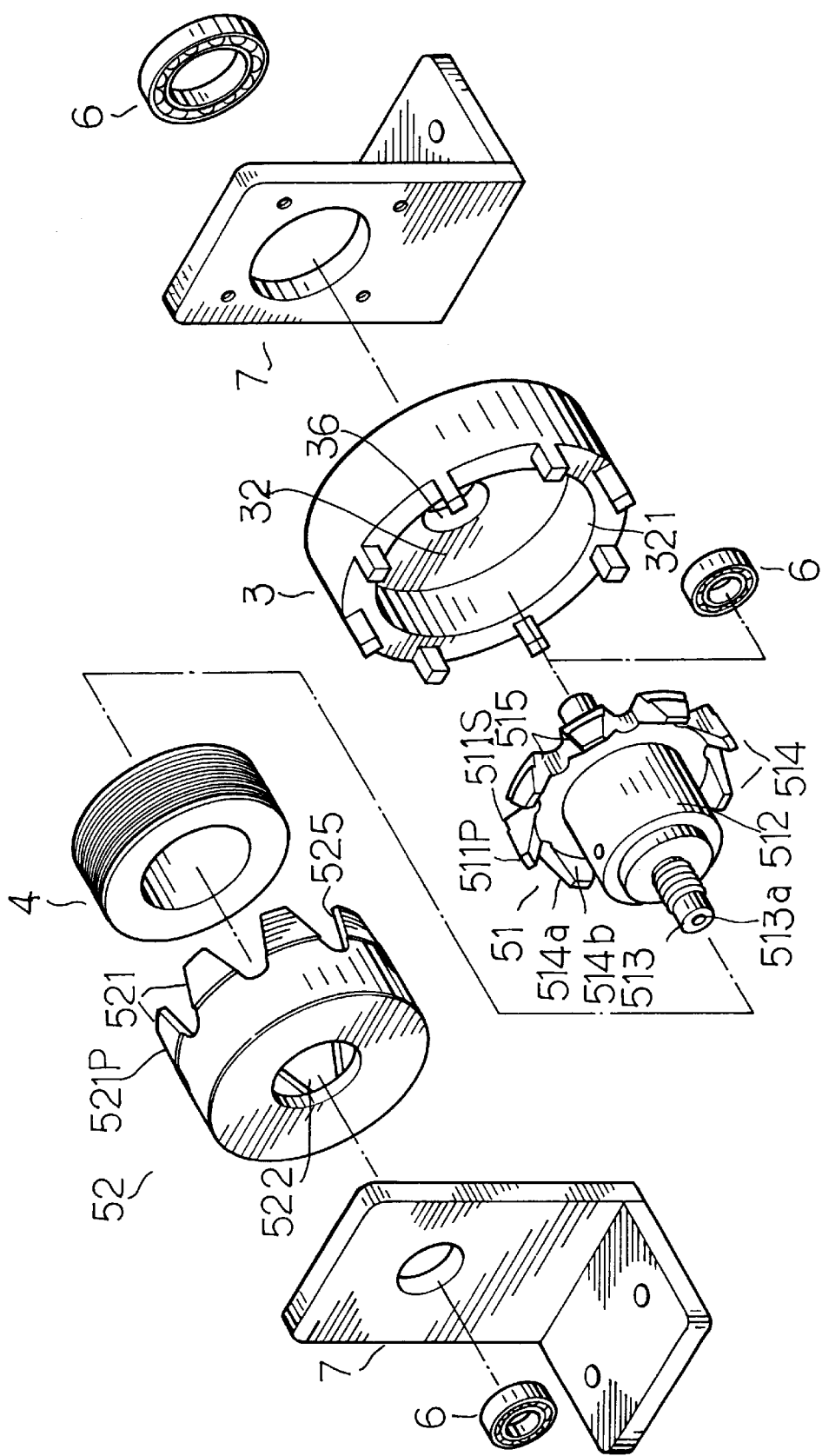
FIG. 2 shows an exploded vies of a first preferred embodiment of the present invention.

As shown in FIG. 2, a mechanism of the first preferred embodiment of the present invention is designed for use in a chest building machine such that the mechanism effects a load in place of the conventional lead weight. The mechanism of the first preferred embodiment of the present invention comprises a support frame to which an excited magnetic cylinder 5 and a cylindrical wheel 3 are coaxially fastened. The excited magnetic cylinder 5 is provided with a coil seat 512 on which a coil 4 is mounted. The coil 4 is provided with the N rounds of wire winding around the coil 4 such that the wire is connected with an external power source. The excited magnetic cylinder 5 is provided at both ends thereof with a fastening shaft 513, which is received in a bearing 6 of the support frame via the cylindrical wheel 3. As a result, the excited magnetic cylinder 5 is actuated by the fastening shaft 513 to turn. The cylindrical wheel 3 is also provided with a bearing 6 and is actuated by an external force to turn in relation to the excited magnetic cylinder 5.

Figure 3:
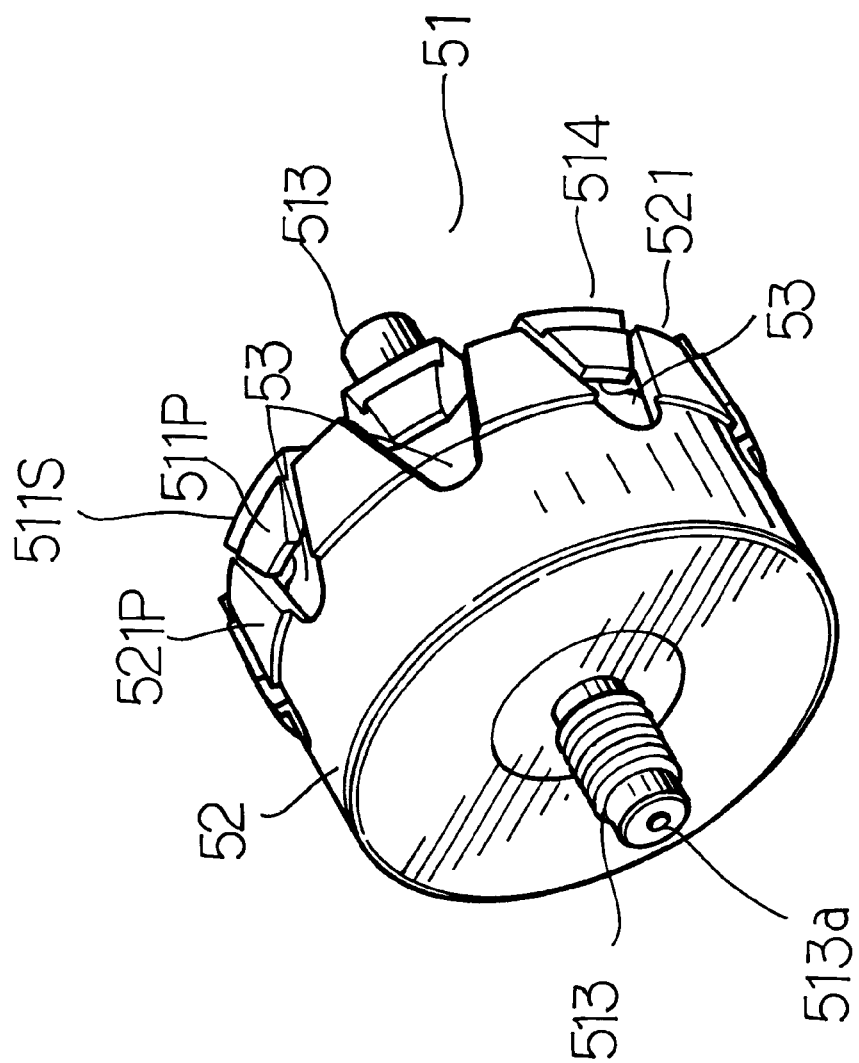
FIG. 3 shows a perspective view of an excited magnetic cylinder of the first preferred embodiment of the present invention.
Figure 4:
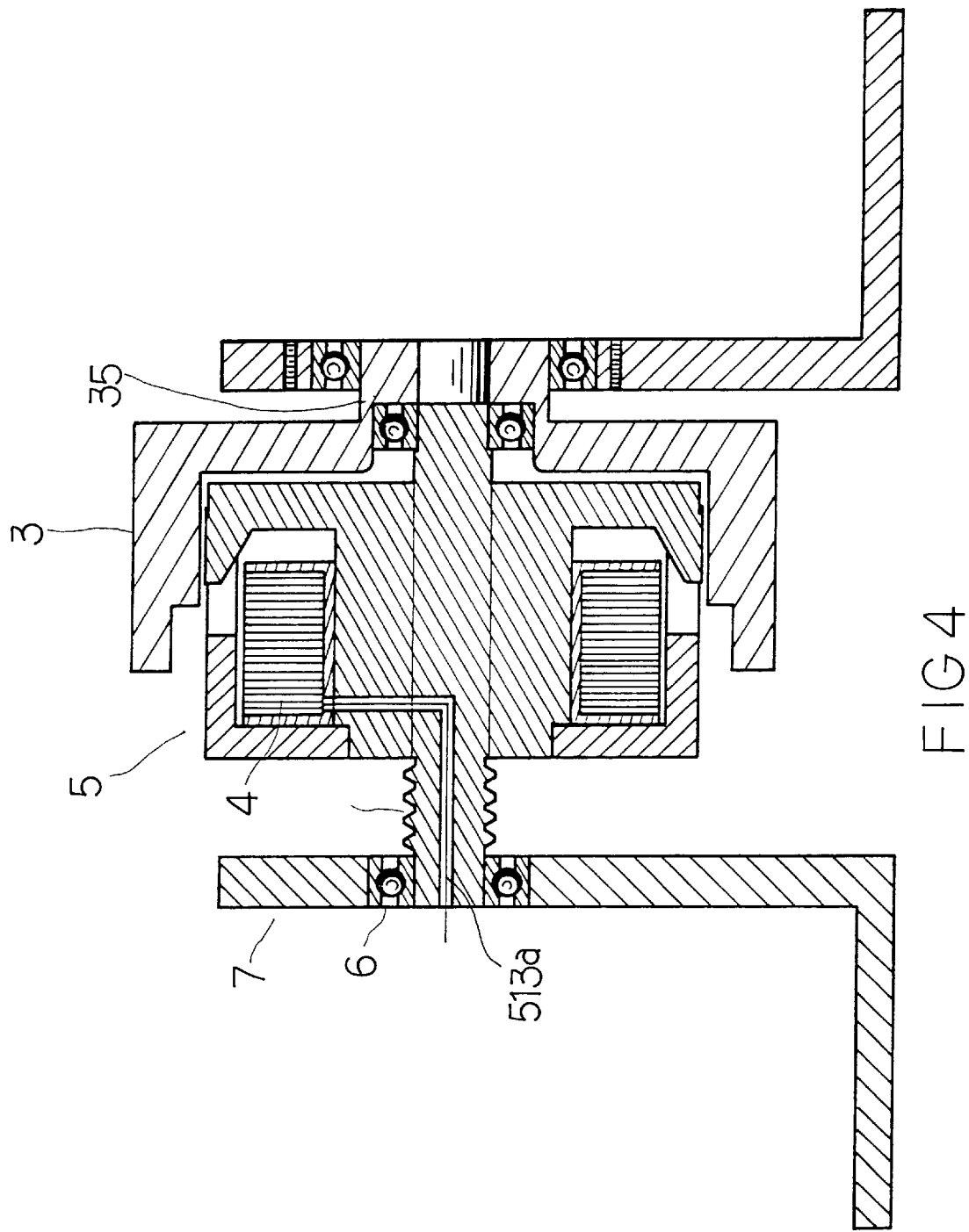
FIG. 4 shows a side sectional view of the first preferred embodiment of the present invention.
Figure 5:
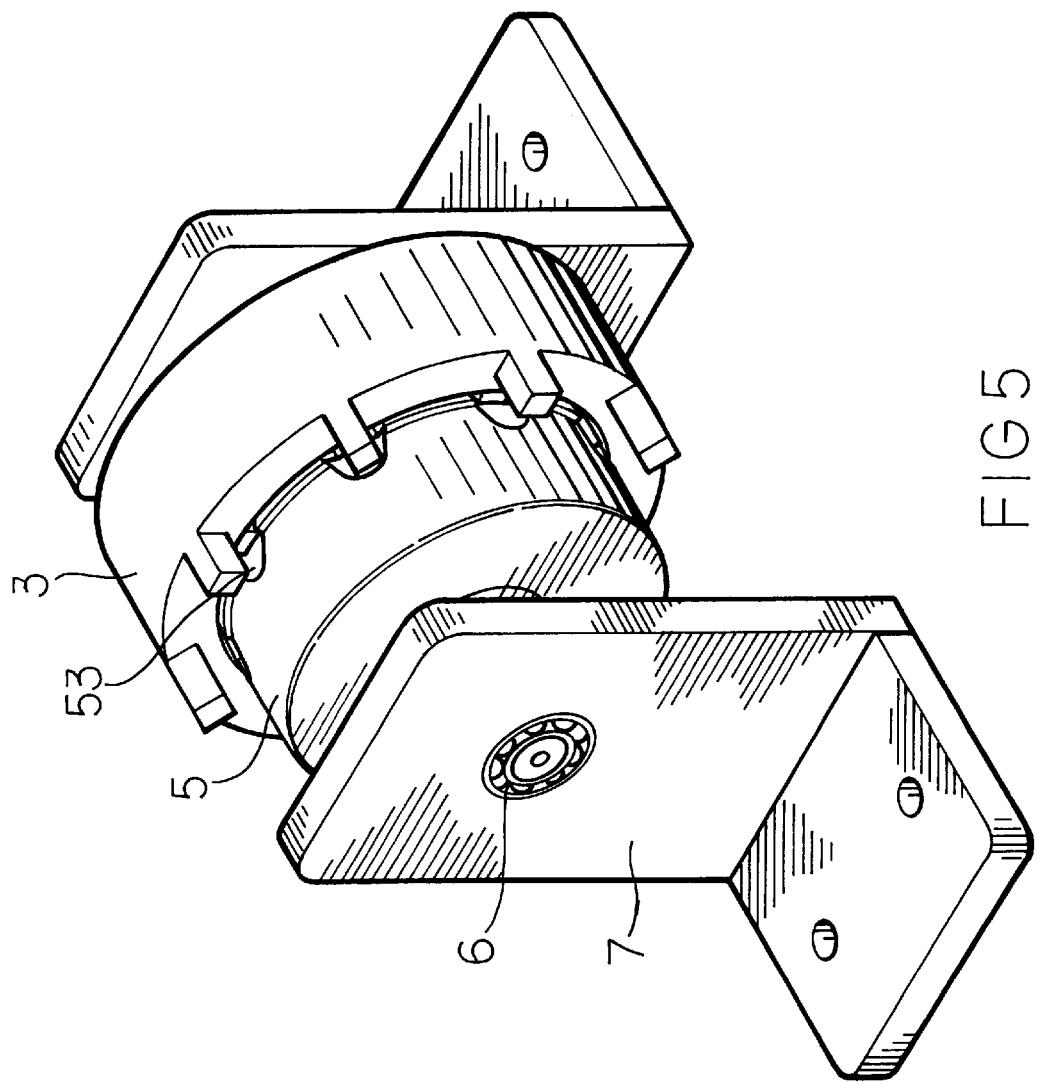
FIG. 5 shows a perspective view of the first preferred embodiment of the present invention.
Figure 6B:
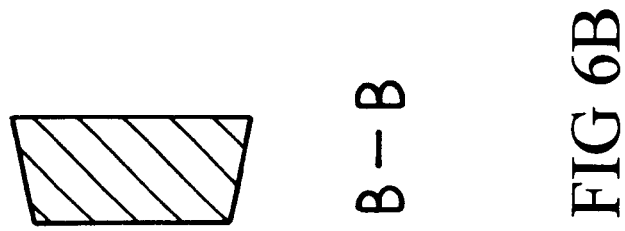
FIG. 6B shows a sectional view of a portion taken along the direction indicated by a line B—B as shown in FIG. 6A.
Figure 6A:
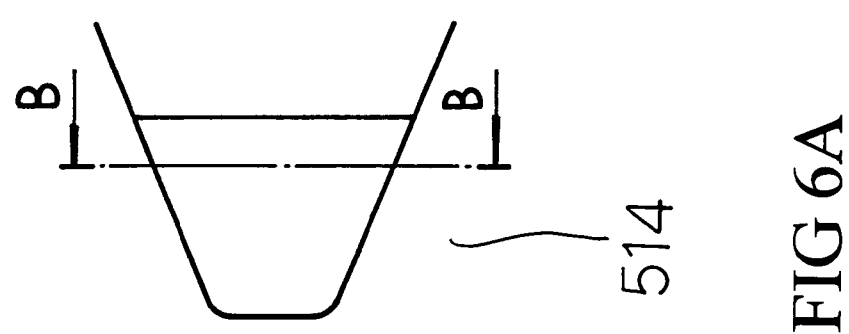
FIG. 6A shows a sectional view of a tapered tooth of the first preferred embodiment of the present invention.
Figure 7:
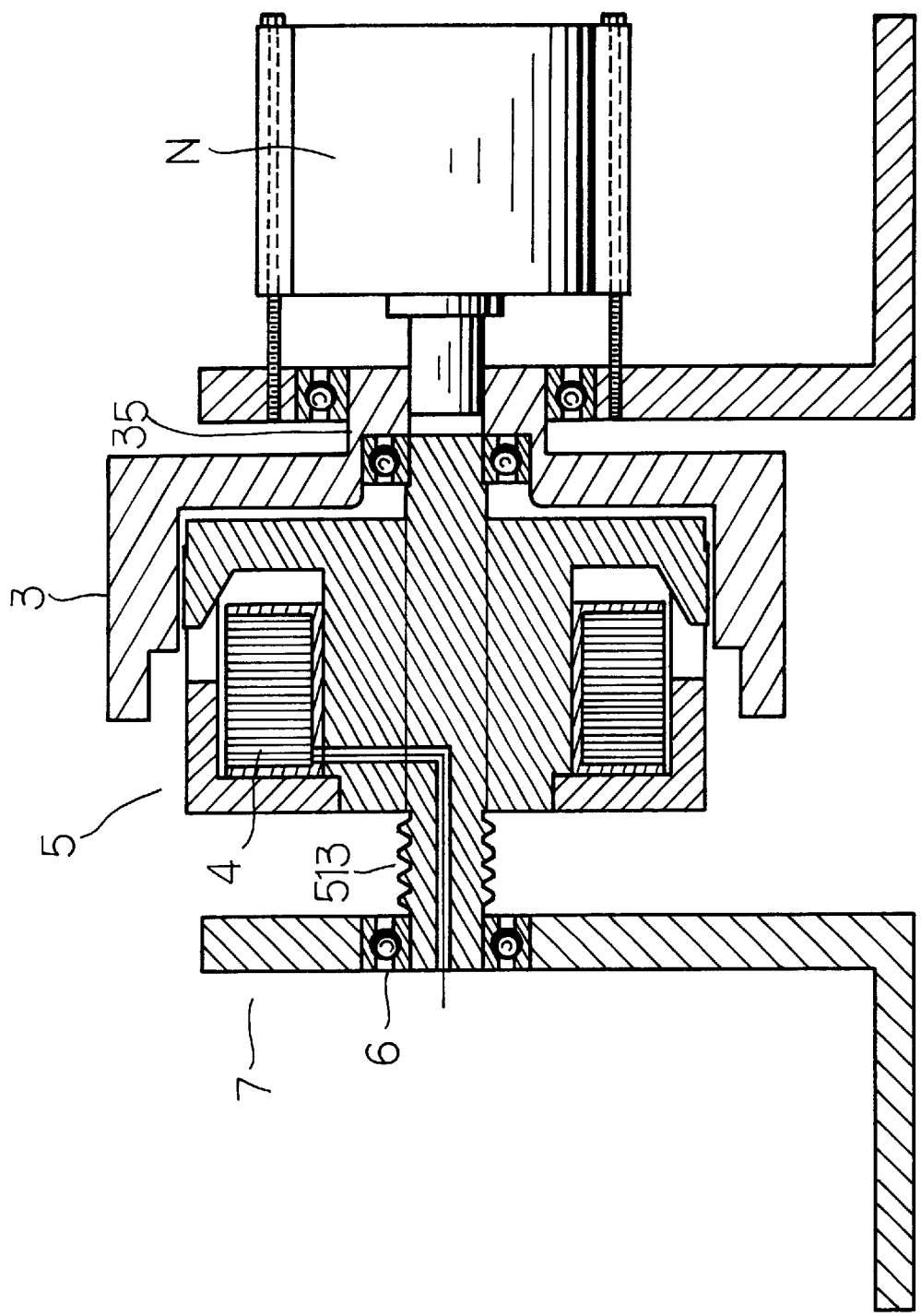
FIG. 7 shows a schematic view of the first preferred embodiment of the present invention connected with a motor.
Figure 8:
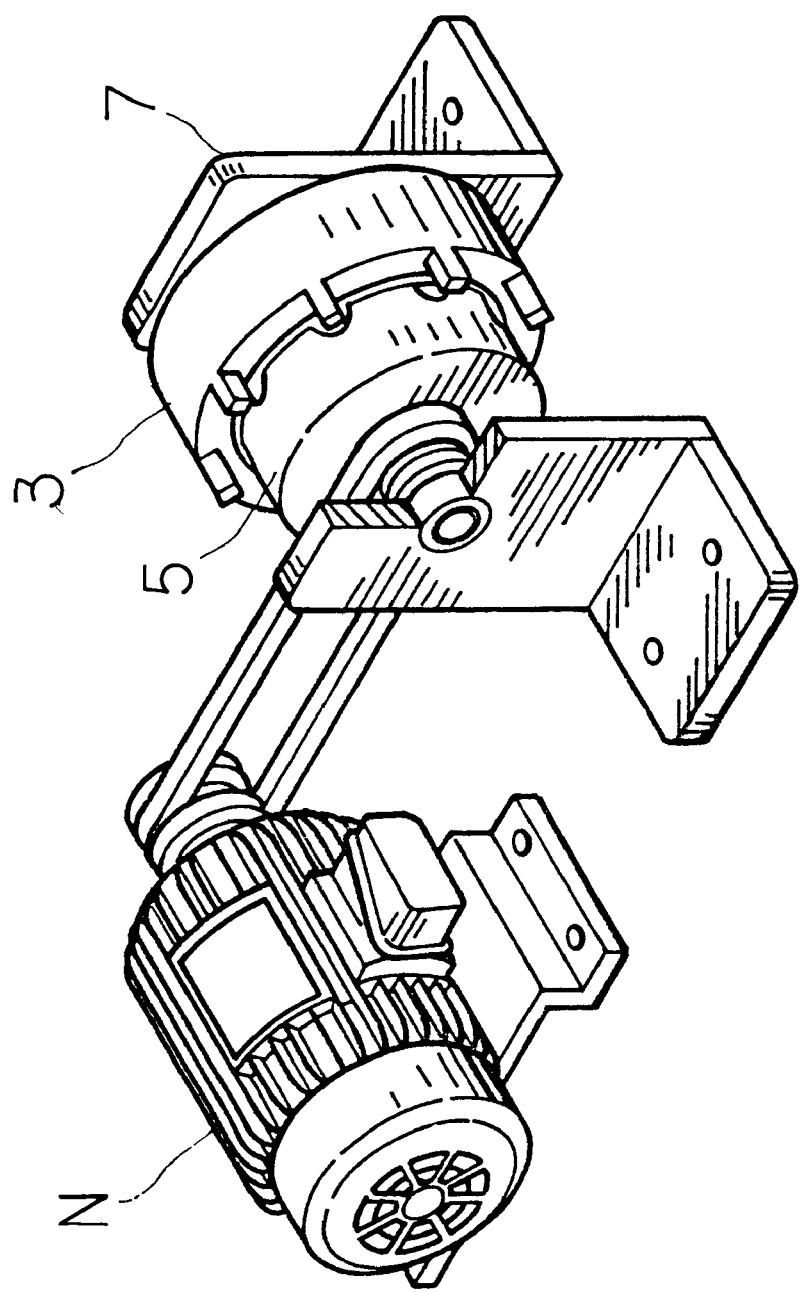
FIG. 8 shows another schematic view of the first preferred embodiment of the present invention connected with the motor.

As shown in FIG. 3, the excited magnetic cylinder 5 is formed of a toothed disk 51 and a toothed cylinder 52 fastened with the toothed disk 51. The toothed disk 51 is provided with a plurality of wing surfaces 511S which are radiated from the axial center of the toothed disk 51 such that the toothed wing surfaces 511S are annularly arranged, and that the wing surfaces 511S are provided with a plurality of tapered teeth 514, with each having a pointed end which is thickened to serve as an induction area 511P. The toothed cylinder 52 has a closed end and an axial hole 522. The toothed cylinder 52 is provided at other end thereof with a plurality of round teeth 521, with each being provided at a pointed end thereof with a thickened portion serving as an induction area 521P. The toothed disk 51 is joined with the toothed cylinder 52 such that the tapered tooth 514 is received between two adjoining round teeth 521, and that a wavy gap 53 of N/S pole is formed between the tapered tooth 514 and the round tooth 521. As the coil 4 is provided with the electric current, the induction areas 511P and 521P become the magnetic poles. Now referring to FIGS. 2 and 6, both round teeth 521 and the tapered teeth 514 have an outer side 514a and an inner side 514b narrower than the outer side 514a. The tapered teeth 514 and the round teeth 521 are provided at two opposite ends thereof with a bevel 515, 525 slanting inward. As shown in FIGS. 2 and 4, the coil 4 is enclosed by the toothed disk 51 and the toothed cylinder 52 such that the coil 4 is mounted on a coil seat 512, and that the wire of the coil 4 is connected with an external power source via a wire hole of the coil seat 512 and the through hole 513a of the fastening shaft 513. In light of the through hole 513a extending along the center line of the fastening shaft 513, the wire of the coil 4 is immune from being intertwined by the fastening shaft 513 in motion. The fastening shaft of the first preferred embodiment of the present invention is connected with an external motor N. As the fastening shaft is driven by the motor N, the excited magnetic cylinder 5 or the cylindrical wheel 3 is actuated to turn, as illustrated in FIGS. 7 and 8.

As shown in FIGS. 2–5, the cylindrical wheel 3 is provided in one side thereof with a slot 32, and in other side thereof with a link shaft 35 on which the excited magnetic cylinder 5 is mounted such that the induction areas of the excited magnetic cylinder 5 are located in the slot 32 of the cylindrical wheel 3, and that the inner wall 321 of the slot 32 surrounds the induction areas 511P and 521P of the excited magnetic cylinder 5, and further that the inner wall 321 of the slot 32 is separated from the induction areas 511P and 521P by an appropriate air gap. The cylindrical wheel 3 is provided at the center thereof with a wheel hole 36 and a bearing 6 which is disposed in the wheel hole 36. The fastening shaft 513 of the excited magnetic cylinder 5 is fastened with the support frame 7 via the bearing 6.

When the coil 4 of the preferred embodiment of the present invention is provided with electric current, a magnetic field is generated around the coil 4. In the meantime, the magnetic flux is brought about on the excited magnetic cylinder 5. As a result, the induction areas 511P and 521P of the toothed disk 51 and the toothed cylinder 52 become magnetic poles. The magnetic loop is formed by the magnetic line expanding toward the inner magnetic path, the outer magnetic path, the magnetic poles, and the cylindrical wheel 3. When the motor N actuates the fastening shaft 513, the cylindrical wheel 3 turns. As a result, the eddy current is induced between the induction areas 511P and 521P of the excited magnetic cylinder 5 and the inner wall 321 of the slot 32 of the cylindrical wheel 3. The eddy current and the magnetic flux interact to bring about a rotation moment. When the excited magnetic cylinder 5 is exerted on by an external force opposite in direction to the rotation moment, the rotation moment becomes a resistance force working against the cylindrical wheel in motion. The resistance force can be transmitted to the application board of a chest building machine by a pulley W.

Figure 9:
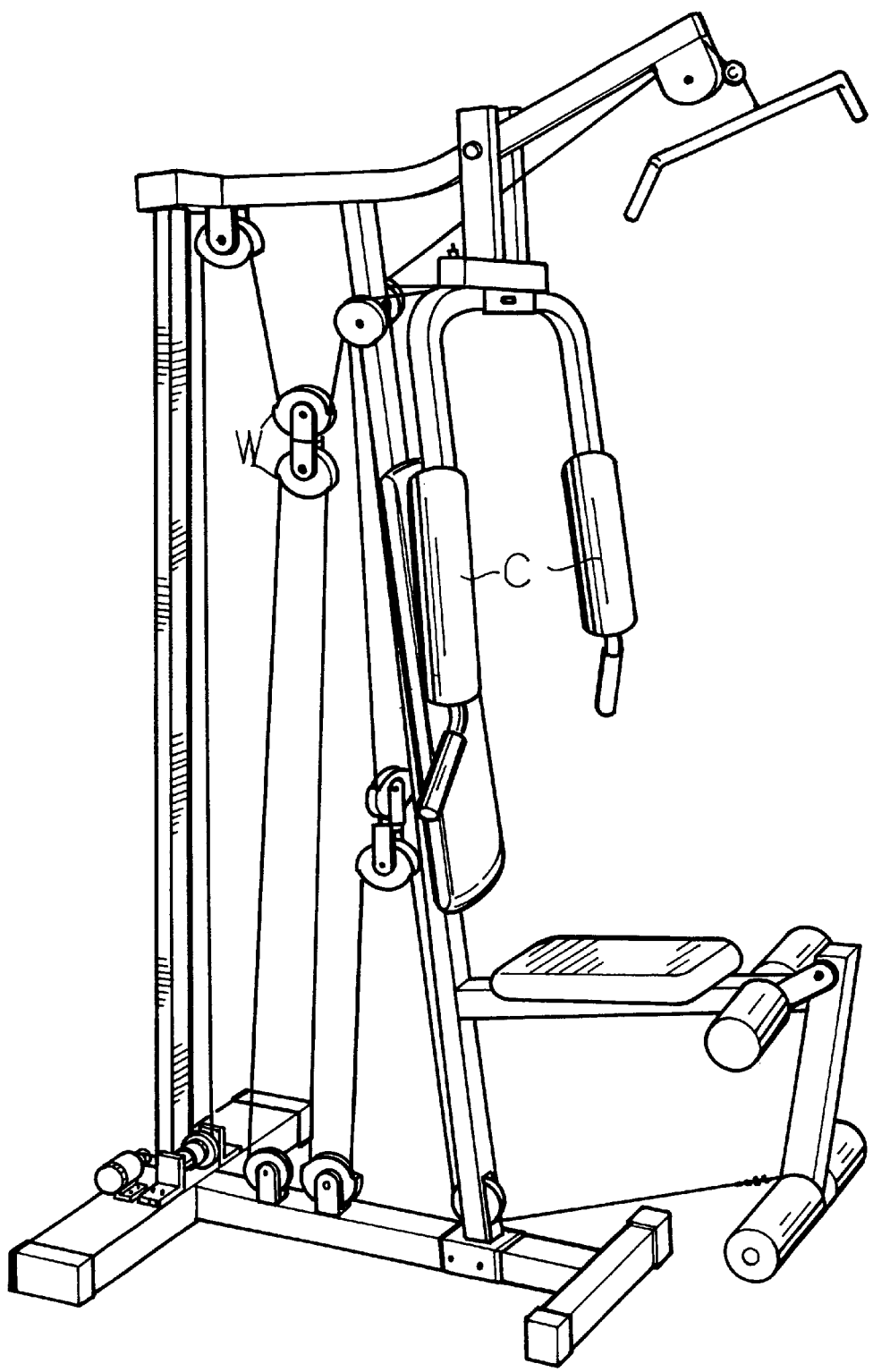
FIG. 9 shows a schematic view of the first preferred embodiment of the present invention at work.

Now referring to FIG. 9, the first preferred embodiment of the present invention is shown to be applied to the application board C of a chest building machine such that the application force is transmitted by the excited magnetic cylinder 5 and a plurality of intermediate pulleys W. When the application board C is pushed inward by an exerciser, the excited magnetic cylinder 5 is actuated to turn. In the meantime, the excited magnetic cylinder 5 is exerted on by the rotation moment which is brought about by the rotation of the cylindrical wheel 3 driven by the motor. The excited magnetic cylinder 5 is thus exerted on by a resistance force opposite in direction to the force pulling the application board C and the pulleys W. The exerciser must apply force on the application board C to resist the resistance force of the excited magnetic cylinder 5, so as to actuate the excited magnetic cylinder 5 to turn until the two application boards C come to join together. Before the two application boards C are let go to return to their original positions, the electric current of the coil is lowered so as to reduce the resistance force exerting on the excited magnetic cylinder 5. As a result, the force of pulling back on the pulley W is reduced. The application boards are let go slowly to prevent the muscles of the exerciser from being injured by the excessive pull force.

Figure 10:
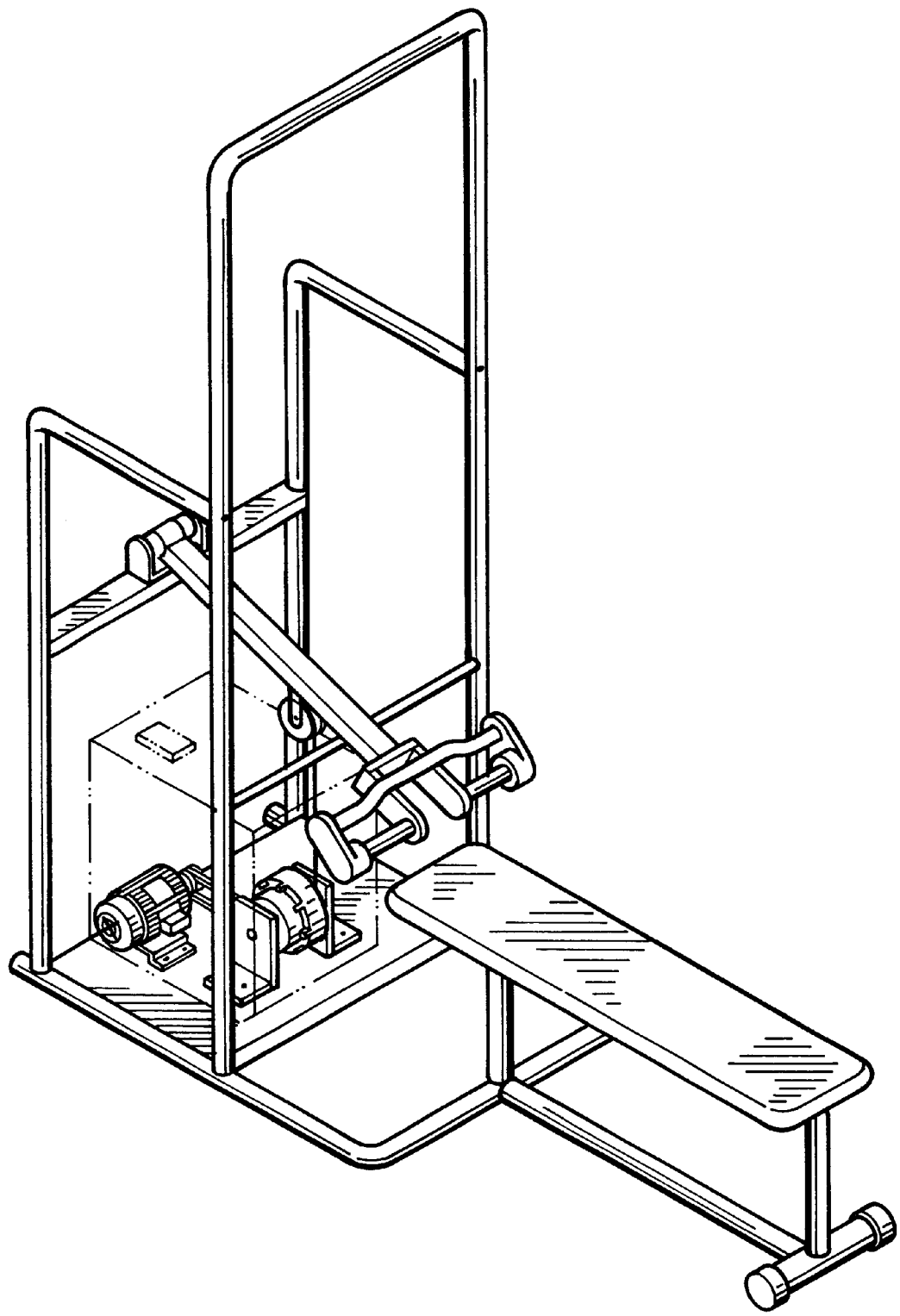
FIG. 10 shows another schematic view of the first preferred embodiment of the present invention at work.
Figure 11:
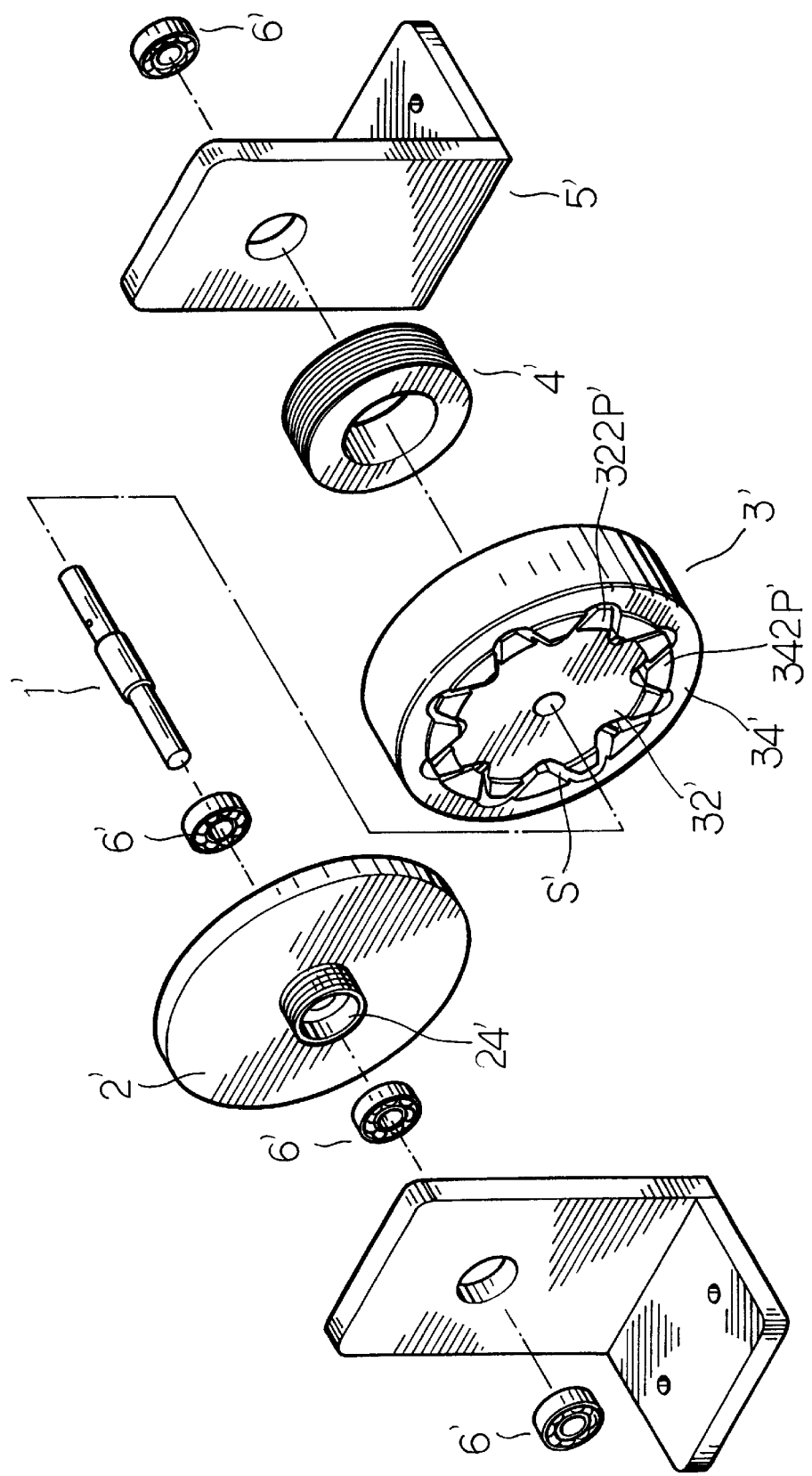
FIG. 11 shows an exploded view of a second preferred embodiment of the present invention.

As shown in FIG. 10, the first preferred embodiment of the present invention is applied on a weight-lifting machine by the same principle described above with reference to the chest building machine. The application force is transmitted to the weight-lifting machine by a plurality of intermediate pulleys W such that the force of pulling back can be controlled.

The first preferred embodiment of the present invention is optionally provided with a power source control mechanism for regulating the magnitude of the current input so as to adjust precisely the magnitude of the resistance as desired. The power source control mechanism is digitally operated.

Figure 1:
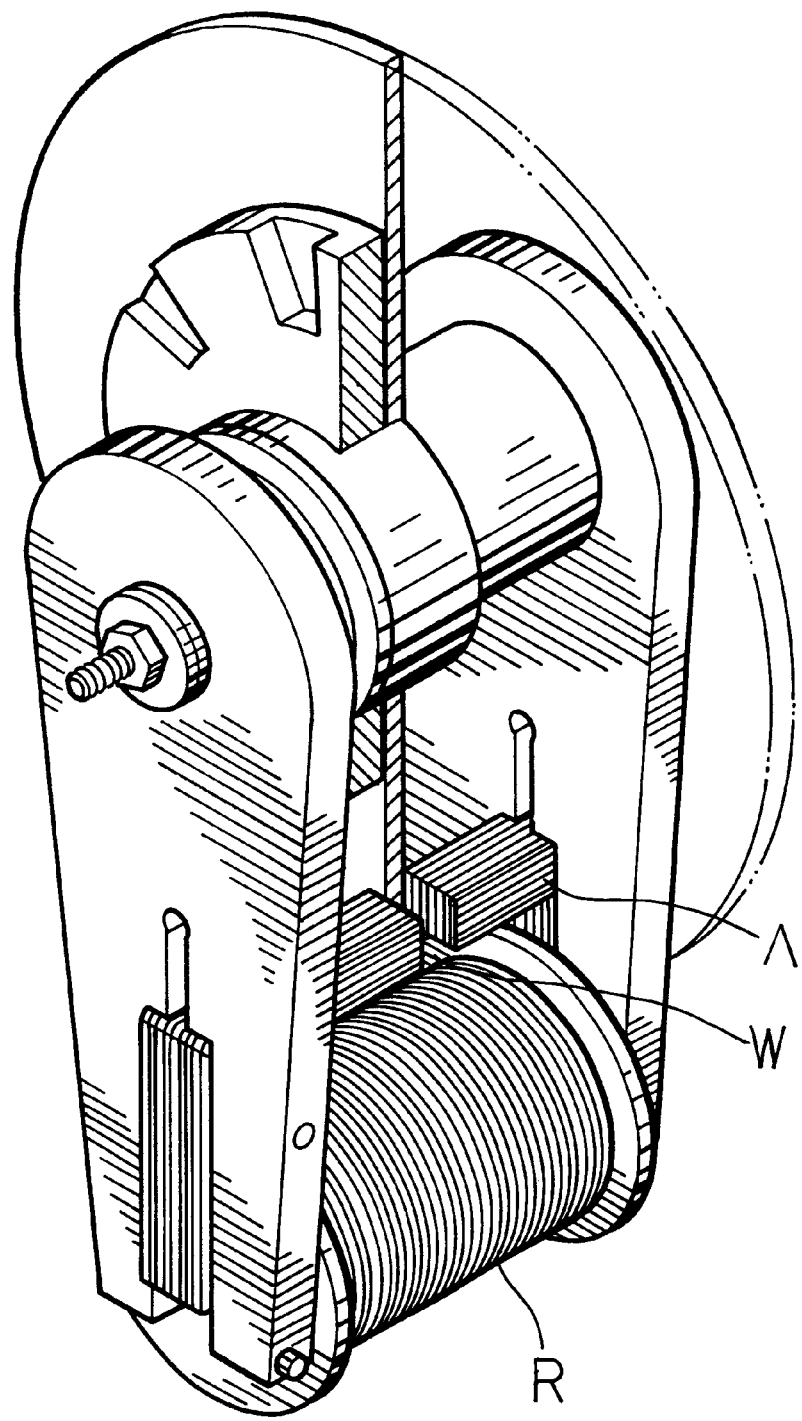
FIG. 1 shows a side sectional view of a prior art device for effecting a resistance force.
Figure 12:
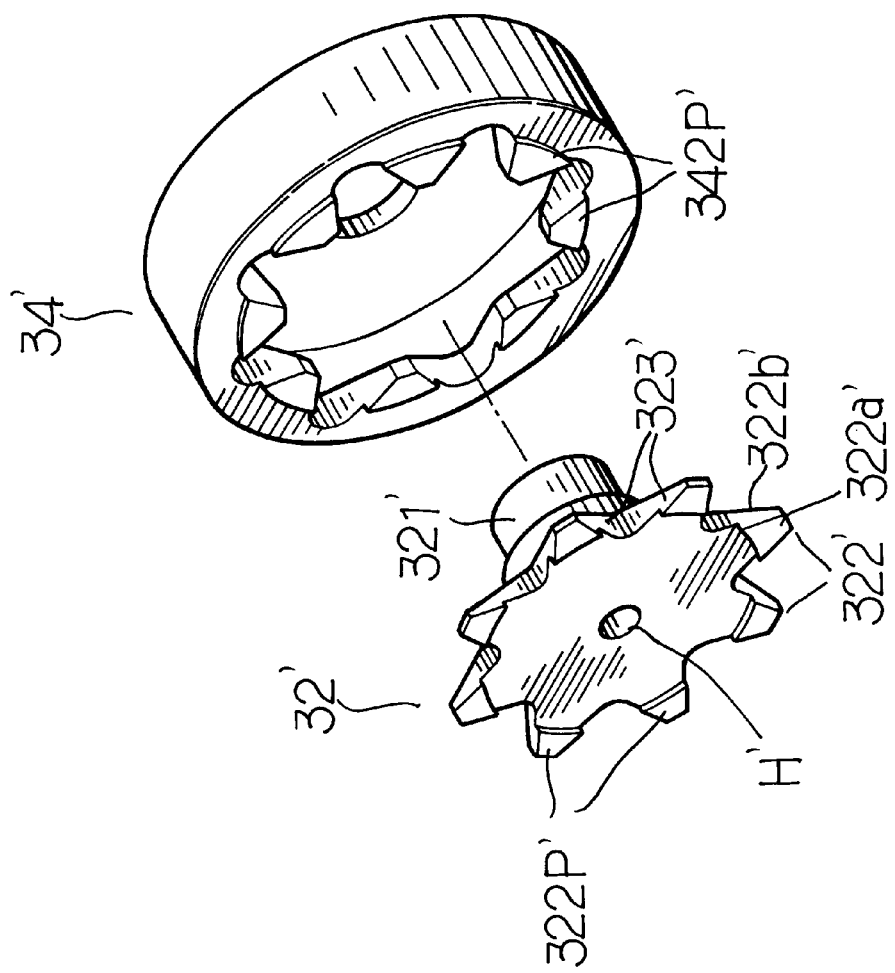
FIG. 12 shows a schematic perspective view of an excited magnetic disk of the second preferred embodiment of the present invention.
Figure 13:
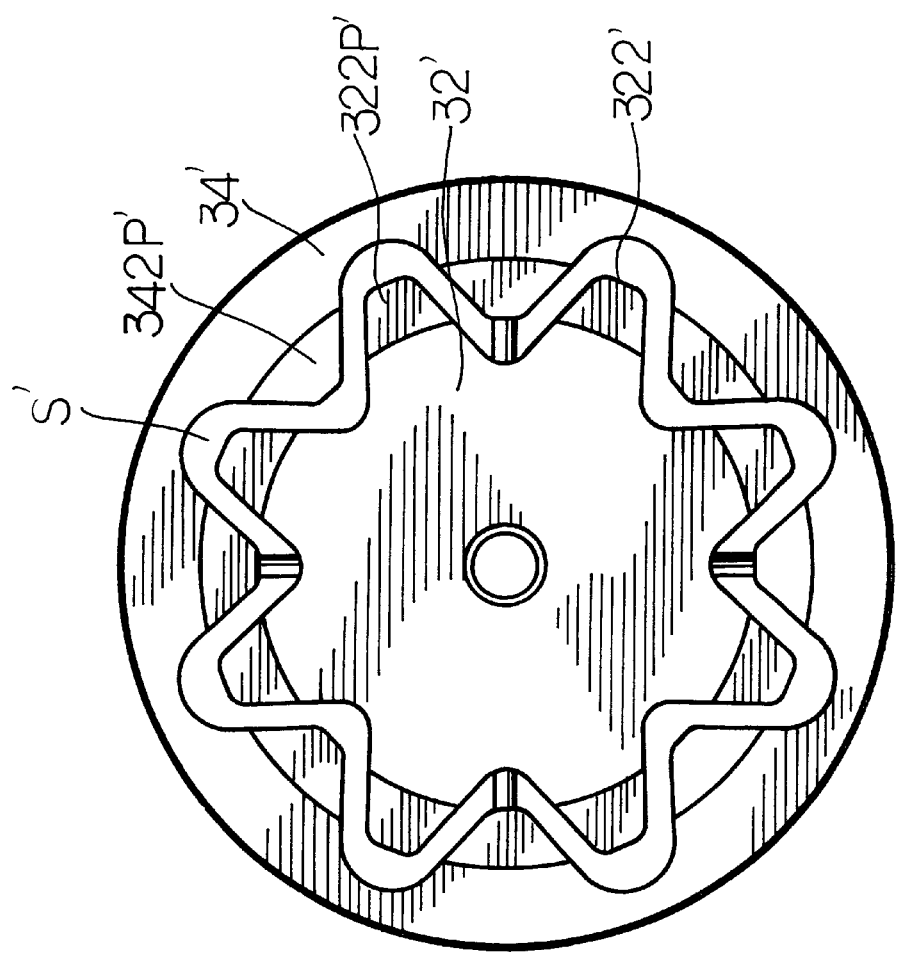
FIG. 13 shows a plan view of the disk surface of the excited magnetic disk of the second preferred embodiment of the present invention.

As shown in FIG. 1, a mechanism of the second preferred embodiment of the present invention comprises a fastening shaft 1' by means of which a braking wheel 2', an excited magnetic disk 3', and an excited magnetic coil 4' are fastened with a support frame 5'. The excited magnetic disk 3' is formed of an internal excited magnetic disk 32' and an external excited magnetic disk 34'. The excited magnetic disk 3' is provided with a shaft seat 321' on which the excited magnetic coil 4' is mounted. As shown is FIGS. 12 and 13, the internal excited magnetic disk 32' has a radiate wing-shaped disk surface portion and the shaft seat 321' which is connected with the disk surface portion such that the connection portion serves as a center from which a plurality of wing pieces 322' are arranged in a radiate manner. The wing pieces 322' have an outer side 322a' and an inner side 322b' narrower than the outer side 322a'. The wing pieces 322' are provided at two opposite ends thereof with a bevel 323' slanting inward and serving as a current gliding surface. The wing pieces 322' are provided at the tail end of the outer side 322a' thereof with a thickened portion 322P' (magnetic pole) serving as an induction area, which is thicker than the remaining portion serving as the magnetic path. The shaft seat 321' is of a cylindrical construction and is provided at the center thereof with an axial hole H' for receiving the fastening shaft 1' which is fastened with the support frame 5'. The external excited magnetic disk 34' is provided with a hollow toothed ring in which the internal excited magnetic disk 32' is received such that the wing pieces of the internal excited magnetic disk 32' are received between the round teeth of the external excited magnetic disk 34'. The round teeth are provided at a pointed end thereof with a thickened portion 342P' serving as an induction area. As shown in FIG. 13, the internal excited magnetic disk 32' and the external excited magnetic disk 34' are joined together such that the disk surface is provided with a wavy gap S' of N/S pole, and that the thickened portions 322P' and 342P' are arranged annularly along the fringe of the disk surface. These thickened portions become magnetic poles when they are provided with electric current. The excited magnetic coil 4' is provided with N circles of wire and is mounted on the shaft seat 321'.

Figure 14:
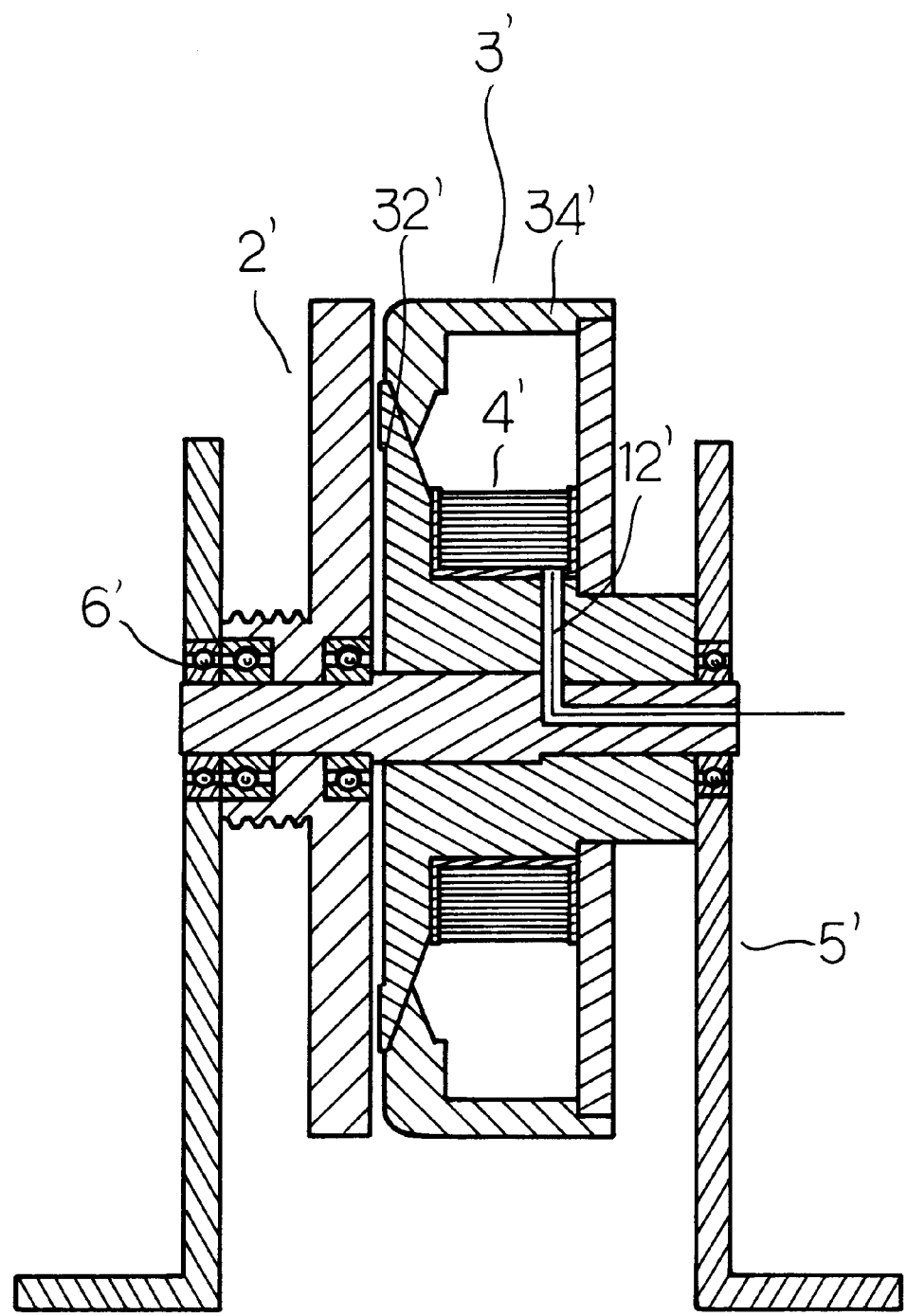
FIG. 14 shows a side sectional view of the second preferred embodiment of the present invention.
Figure 15:
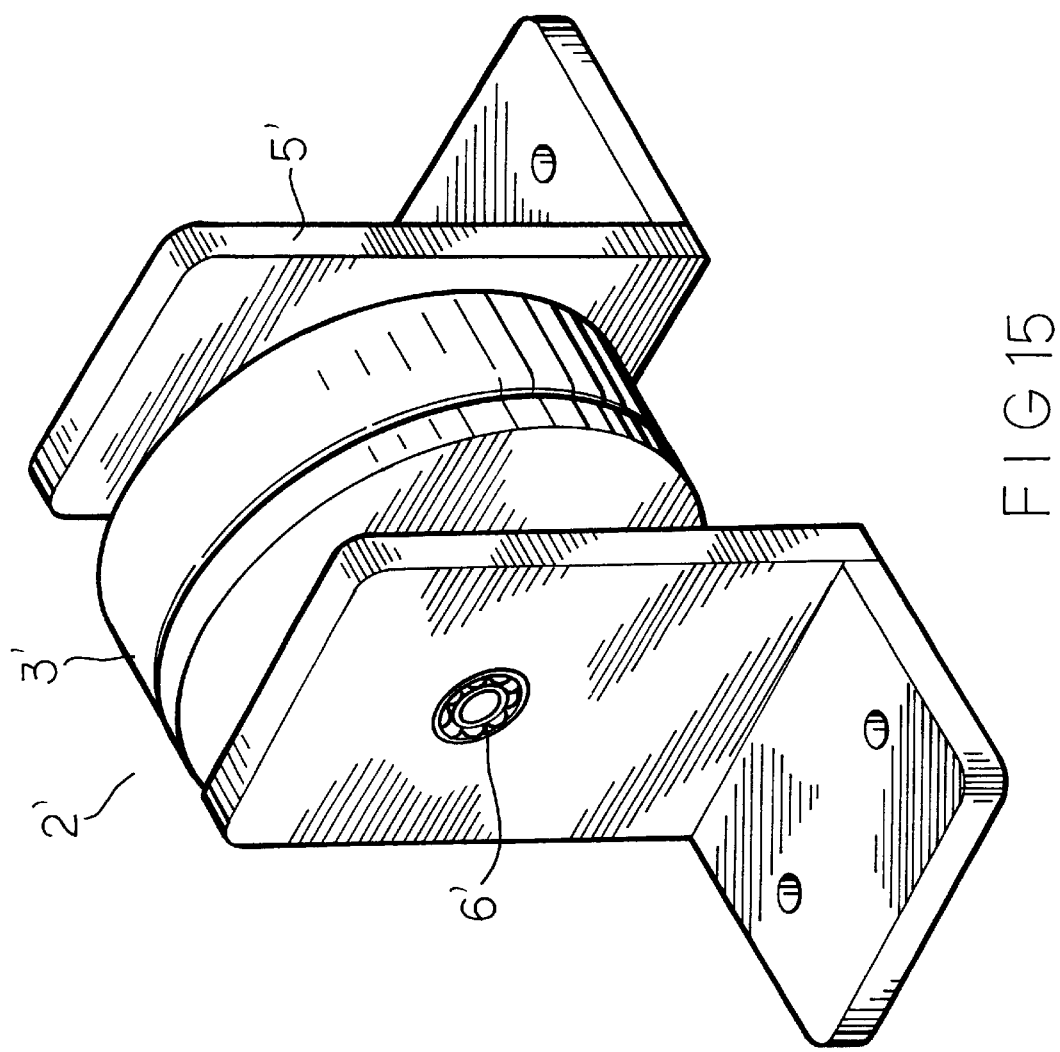
FIG. 15 shows a perspective view of the second preferred embodiment of the present invention.

As shown in FIGS. 14 and 15, the braking wheel 2' is located outside the induction areas of the excited magnetic disk 3'. The braking wheel 2' is provided at the center thereof with a wheel hole 24' and two bearings 6' which are disposed in the wheel hole 24'. The excited magnetic disk 3' and the excited magnetic coil 4' are mounted on the fastening shaft 1' which is fastened with the support frame 5' via the bearings 6' of the wheel hole 24' of the braking wheel 2'. The fastening shaft is driven by the motor and is linked with the braking wheel 2' or the excited magnetic disk 3'. The braking wheel 2' is also provided therein with bearing 6' and is capable of radial rotation independently. The fastening shaft, the excited magnetic disk shaft seat the coil are provided with a wire hole. The fastening shaft is provided with a through hole extending along the direction of the center line thereof. The wire hole and the through hole form an L shape 12' through which the wire of the excited magnetic coil 4' is put through the fastening shaft 1' to be connected with an external power source. As a result, the coil is not intertwined or loosened by the fastening shaft in motion.

The excited magnetic disk 3' and the braking wheel 2' of the second preferred embodiment of the present invention are arranged side by side such that the disk surface of the excited magnetic disk 3' and the wheel surface of the braking wheel is separated by an appropriate air gap. When the coil is provided with electric current, a magnetic field is induced around the coil 4'. In the meantime, a magnetic flux is effected on the internal excited magnetic disk 32' and the external excited magnetic disk 34' of the excited magnetic disk 3' such that the induction areas 322P' and 342P' become magnetic poles, and that a magnetic loop is formed by a magnetic line expanding toward the inner magnetic path, the outer magnetic path, the magnetic poles, and the braking wheel. The braking wheel 2' is actuated by the fastening shaft to turn such that the eddy current is induced between the braking wheel and the excited magnetic disk 3'. The eddy current and the magnetic flux interact to bring about the rotation moment.

Figure 16:
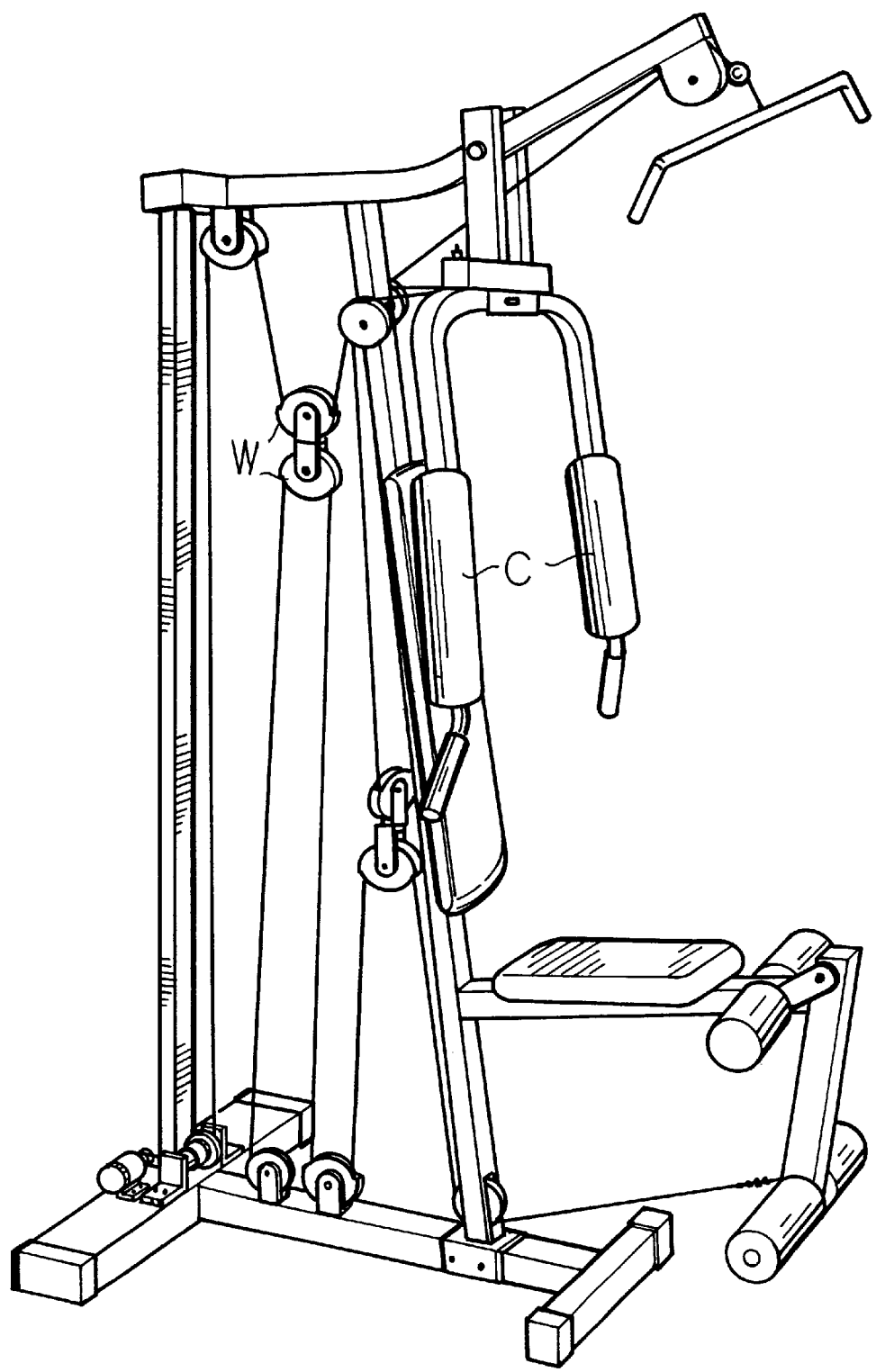
FIG. 16 shows a schematic view of the second preferred embodiment of the present invention at work.

As shown in FIG. 16, the mechanism of the second preferred embodiment of the present invention is used as a load structure in place of the conventional lead weight of a chest building machine. The second preferred embodiment is similar in principle to the first preferred embodiment. The link shaft of the excited magnetic disk 3' of the second preferred embodiment is provided with a pulley wire for competing with a plurality of pulleys so as to transmit force to the application boards C. When the application boards C are forced by an exerciser to move toward each other, the force exerting on the application boards C actuates the excited magnetic disk 3' to turn. In the meantime, the braking wheel 2' is driven by the motor to turn to bring about a rotation moment, which works against the excited magnetic disk 3'. As a result, the exerciser must exert a great force on the application boards so as to overcome the resistance of the excited magnetic disk 3' until such time when the two application boards C are joined together. Before the two application boards C are let go to return to their original state, the magnitude of the power of the braking wheel 2' is lowered so as to reduce the magnitude of the resistance exerting on the excited magnetic disk 3'. As a result, the pull force of the application boards C and the pulleys W is reduced to allow the application boards C to return slowly to their original state.

Figure 17:
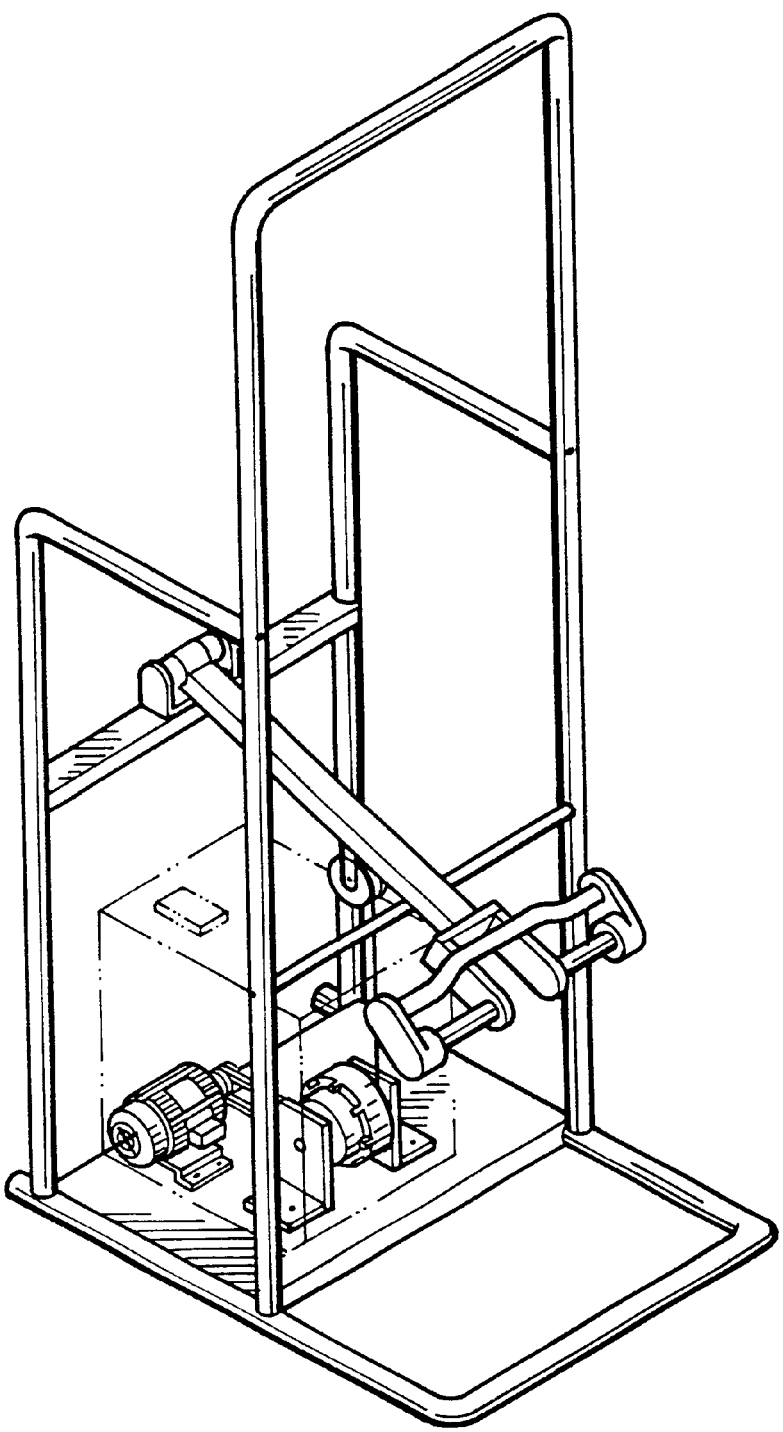
FIG. 17 shows another schematic view of the second preferred embodiment of the present invention at work.

As shown in FIG. 17, the mechanism of the second preferred embodiment of the present invention is applied to a weight-lifting machine such that the application force is transmitted by a plurality of intermediate pulleys W to the pull handles of the weight-hefting machine, and that the pull force is controlled to facilitate the using of the machine by an exerciser.

The embodiments of the present mvention described above are to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A resisting and pulling mechanism comprising an excited magnetic cylinder and a cylindrical wheel, which are coaxially mounted on two support frames, with each having a bearing, said cylindrical wheel provided with a link shaft which is received in said bearing of one of said two support frames, said link shaft provided with a wheel hole and a bearing which is disposed in said wheel hole, said excited magnetic cylinder and said cylindrical wheel being mounted on a fastening shaft which is received at both ends thereof in said bearings of said two support frames, said fastening shaft provided with a through hole extending along the direction of a center line thereof said excited magnetic cylinder provided with a coil seat on which an excited magnetic coil is mounted such that said excited magnetic coil is connected with an external power source via said through hole of said fastening shaft, said fastening shaft being driven by a motor such that said cylindrical wheel is actuated to couple with said excited magnetic cylinder, thereby resulting in various pulling couple forces in accordance with various resistances; wherein said excited magnetic cylinder is formed of a toothed disk and a toothed cylinder fastened with said toothed disk, said toothed disk being provided with a plurality of annularly-arranged tooth-shaped wing surfaces radiating from an axial center thereof, with each of said wing surfaces having a plurality of tapered teeth, said tapered teeth having a pointed end which is thickened to serve as an induction area, said toothed cylinder having a closed end and an axial hole, said toothed cylinder being provided at other end thereof with a plurality of round teeth, with each of said round teeth having a pointed end which is thickened to serve as an induction area, said toothed disk being fastened with said toothed cylinder such that said tapered teeth of said toothed disk are received between said round teeth of said toothed cylinder, and that a wavy space of N/S pole is formed between said tapered teeth and said round teeth; wherein said tapered teeth and said round teeth have an outer side and an inner side narrower than said outer side; and wherein said tapered teeth and said round teeth are provided at two opposite ends thereof with a bevel slanting inward.

2. A resisting and pulling mechanism comprising two support frames on which a braking wheel, an excited magnetic disk, and an excited magnetic coil are mounted by a fastening shaft, said two support frames being provided with a bearing, said braking wheel being provided at an outer end thereof with a link shaft having a wheel hole and a bearing which is disposed in said wheel hole, said fastening shaft being received at both ends thereof in said bearings of said two support frames such that said excited magnetic disk and said braking wheel are mounted on said fastening shaft; wherein said fastening shaft is provided with a through hole extending along the direction of a center line thereof, said excited magnetic disk being provided with a shaft seat on which said excited magnetic coil is mounted, said fastening shaft, said shaft seat, and said coil being provided with a wire hole forming an L-shaped hole with said through hole of said fastening shaft, said excited magnetic coil being connected with an external power source via said wire hole and said through hole; wherein said fastening shaft is connected with a motor by a belt for actuating said braking wheel to turn continuously such that said braking wheel and said excited magnetic disk couple to effect various pulling couple forces in response to various resistances.

3. The resisting and pulling mechanism as defined in claim 2, wherein said excited magnetic disk is formed of an internal excited magnetic disk and an external excited magnetic disk, said internal excited magnetic disk has a radiate, wing-shaped disk surface portion and a shaft seat portion connected with said disk surface portion such that a connection portion serves as a center from said center a plurality of wing pieces are arranged in a radiate manner, said wing pieces having a tail end which is thickened to serve as an induction area, with the remaining portion of each of said wing pieces serving as a magnetic path, said external excited magnetic disk being provided with an annular structure having a plurality of round teeth and a hollow portion for receiving said wing pieces of said internal excited magnetic disk such that said wing pieces and said round teeth are provided therebetween with a space of N/S pole, whereby said round teeth have a pointed end which is thickened to serve as an induction area.

4. The resisting and pulling mechanism as defined in claim 3, wherein said wing pieces have an outer side and an inner side narrower than said outer side and are provided at two opposite ends thereof with a bevel slanting inward.

5. The resisting and pulling mechanism as defined in claim 2, wherein said braking wheel and said excited magnetic disk are arranged side by side such that a disk surface of said excited magnetic disk and a wheel surface of said braking wheel are opposite to each other and are separated from each other by an air gap.

* * * * *